United States Patent [19]

Ayres

[11] 3,922,917

[45] Dec. 2, 1975

[54] DISPOSABLE THERMOMETER

[75] Inventor: Waldemar A. Ayres, Rutherford, N.J.

[73] Assignee: Becton, Dickinson and Company, East Rutherford, N.J.

[22] Filed: Aug. 31, 1973

[21] Appl. No.: 393,557

[52] U.S. Cl. ............................. 73/356; 73/358
[51] Int. Cl.² .................. G01K 11/20; G01K 11/08
[58] Field of Search .............. 73/356, 358; 206/484

[56] References Cited
UNITED STATES PATENTS

| | | | |
|---|---|---|---|
| 3,465,590 | 9/1969 | Kluth et al. | 73/356 |
| 3,521,489 | 7/1970 | Finkelstein et al. | 73/358 |
| 3,774,450 | 11/1973 | Godsey | 73/358 |

Primary Examiner—Richard C. Queisser
Assistant Examiner—Marcus S. Rasco
Attorney, Agent, or Firm—Kane, Dalsimer, Kane, Sullivan and Kurucz

[57] ABSTRACT

A disposable, nonreversible thermometer is provided. The thermometer comprises a base member and a cover member overlying the base member. A temperature sensitive material meltable at a predetermined temperature is carried by the base member and dye means soluble in the temperature sensitive material in melted form is carried by the cover member spaced apart from the temperature sensitive material. At least one of the members is deformable with respect to the other so as to enable the thermometer to be "armed" and allow the dye to come in contact with the temperature sensitive material. Means are further provided adapted to indicate if the dye goes into solution in the melted, temperature sensitive material thereby providing indication that the melting point of the material has been reached.

5 Claims, 6 Drawing Figures

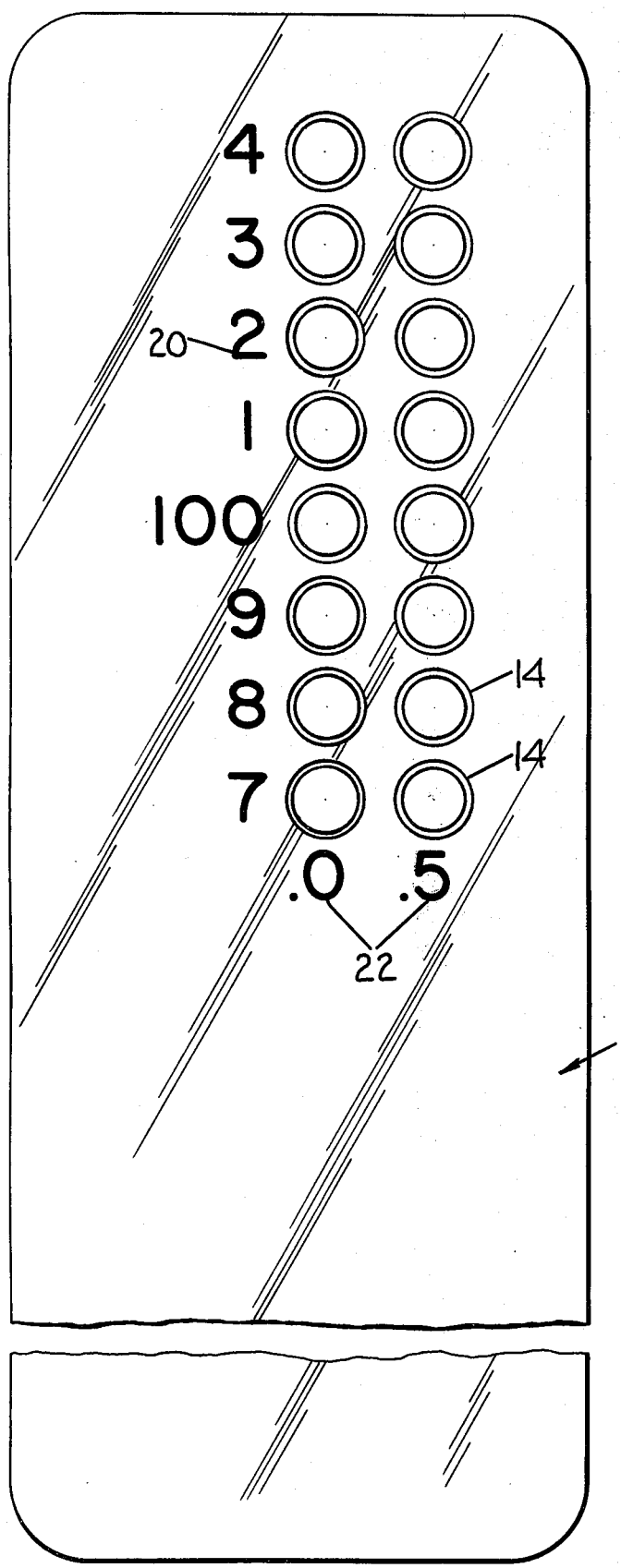
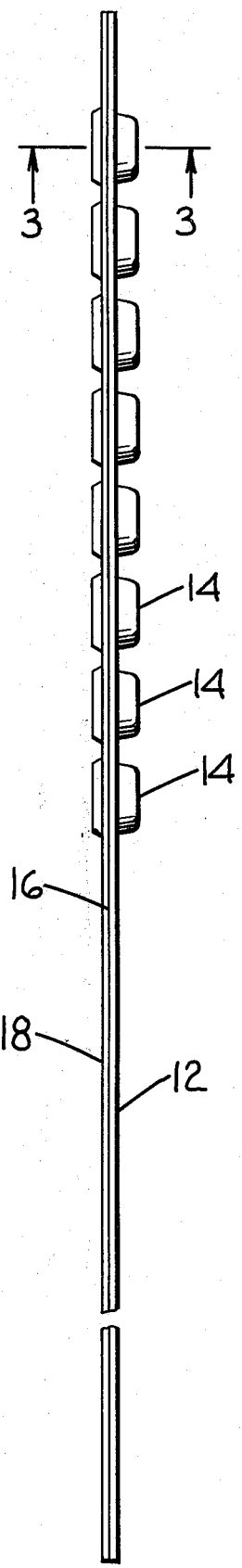

DISPOSABLE THERMOMETER

BACKGROUND OF THE INVENTION

The present invention relates to clinical thermometers and, in particular, to nonreversible, disposable clinical thermometers.

The conventional, mercury-filled, capillary clinical thermometer has many drawbacks particularly with regard to hospital and other mass users. The principal drawbacks are (1) the danger of cross-contamination from patient to patient as the thermometers are used over and over again and (2) necessity that the thermometer be shaken down properly prior to each use. There are other obvious disadvantages posed by conventional thermometers such as the jagged glass or mercury hazards broken thermometers may present. In addition, the conventional, clinical thermometer is relatively hard to read especially by non-trained personnel as is often the case in home usages.

In view of the above, there has arisen a need for a relatively simple-to-read and use thermometer which is also sufficiently inexpensive to manufacture to enable its being thrown away after a single use. It is also desirable that a disposable thermometer be irreversible so as to provide a permanent record of the patient's temperature if desired. Heretofore, several schemes have been proposed wherein the melting of a temperature sensitive material having a known melting point is utilized for temperature determination.

One problem encountered by such disposable thermometers and, indeed, even clinical thermometers is that of the thermometer being exposed to temperatures in or above the human fever range during storage or shipment. Thus, while the fever of a human being normally stays within the range of 97°–104°F, there are many places where temperatures far in excess of this range are normally encountered. This is especially true in the summertime within freight cars or the trucks by which such thermometers may be shipped or the storage facilities wherein the thermometers are stored.

In view of the above, it is the principal object of the present invention to provide a relatively simple and inexpensive, irreversible, clinical thermometer. A further object is to provide such a clinical thermometer which must be "armed" prior to use and which, in the "unarmed" state, can be exposed to temperatures in excess of the clinical thermometer temperature range without initiating the irreversible temperature indicating process.

SUMMARY OF THE INVENTION

The above and other beneficial objects and advantages are attained in accordance with the present invention by providing a disposable, irreversible, clinical thermometer comprising a base member carrying a temperature sensitive material and a cover member overlying the base member. The temperature sensitive material is selected to melt at a predetermined temperature. Dye means are carried by the cover member spaced apart from the material. The dye means are soluble in the temperature sensitive material in melted form and means are provided to indicate if the dye goes into solution in the melted material. At least one of the base and cover members is deformable with respect to the other whereby to enable the dye to come in contact with the material thus "arming" the thermometer. Prior to such "arming" the dye and material are maintained apart.

In order to effectively cover the entire fever range, a plurality of meltable materials is provided with each material of the plurality having a distinct melting point at a predetermined temperature within the human temperature range. Dye means and indicating means are associated with each of the materials of the plurality so that an indication of the temperature of the patient under consideration may be obtained.

BRIEF DESCRIPTION OF THE DRAWINGS

In the accompanying drawings:

FIG. 1 is a fragmentary top plan view of the disposable thermometer in accordance with the present invention;

FIG. 2 is a side elevational view of the present thermometer;

DETAILED DESCRIPTION OF THE PREFERRED EMBODIMENT

Figure 3:
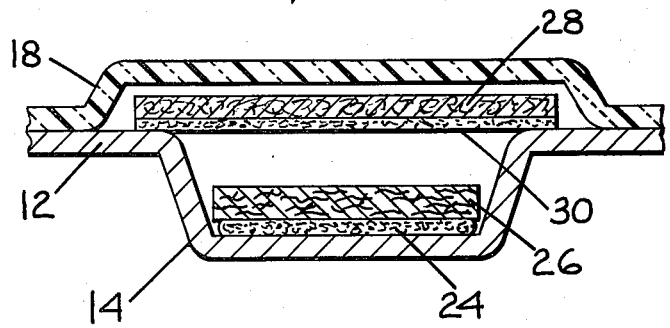
FIG. 3 is a fragmentary sectional view of one of the temperature sensing units, taken along reference lines 3—3 of FIG. 2, looking in the direction indicated by the arrows.

Referring to FIGS. 1 and 2, there is shown a disposable thermometer constructed in accordance with the present invention. The thermometer comprises a body 10 formed of a base member and cover member. The base member comprises a strip of deformable foil 12, such as aluminum foil, having a thickness on the order of 0.006 inches (or other preferred thickness) and having formed therein cups 14 most clearly shown in FIG. 2. The upper surface of the aluminum foil is coated with an adhesive 16 such as Dupont Chemical Corp.'s "Surlyn 1602" for heat sealing. The top surface of the foil is covered with a transparent plastic, such as a Mylar sheet 18 (or other preferred plastic), having a thickness on the order of ½ ml. (or other preferred thickness) and coated on its undersurface with 2 mls. of "Surlyn 1602" or other preferred adhesive. The transparent plastic sheet may be heat sealed to the aluminum base 12 by exposure to a temperature of 350°F for a period of approximately 2 seconds. Any other preferred method or means for bonding the top and bottom sheets may be employed.

As shown, the base 12 has a plurality of cups 14 formed therein. Indicia 20, in the form of printed numerals, may be provided to indicate temperatures within the range of 97°F to 104°F in half degree intervals with one of the rows indicating full degrees and the other, half degrees.

Referring now to FIG. 3, there is shown a cross-section of a typical cup 14 which provides a single temperature indicator. Disposed inside each cup 14 is a layer of adhesive 24 such as Goodyear "Pliobond" for adhesively connecting a disc 26 of absorbent material such as a cloth disc to the bottom of cup 14. The disc 26 is saturated with a temperature sensitive material which melts at the temperature indicated by the associated indicia 20 and 22. That is, the material within the cup associated with 99.0 melts at 99.0°F, the material within the cup associated with 100.5 melts at 100.5°F etc. As stated, the cloth disc is saturated with the temperature sensitive material and may be formed by heating a cotton cloth and thereafter depositing a quantity of the temperature sensitive material on the heated cloth so that the temperature sensitive material melts and is absorbed into the heated cloth.

A separate absorbent disc 28 is located above and spaced apart from cup 14. The second disc is preferably opaque and may comprise a sheet of blotting-type paper, for example common white news print. A layer of dye 30 is deposited on the under surface of the news print facing the meltable material as shown. The dye chosen should have an intense color readily visible in contrast to the news print. In a successful practice of the invention, the dye used was 6968-Azo oil blue black B supplied by National Aniline, division of Allied Chemical Co. The dye, in powdered form, is brushed onto the under surface of disc 28 in such a manner as to prevent its being absorbed into the disc. In this way, the dye powder is not visible from the top surface of blotter 28 which, in turn, is visible through the plastic cover. The dye selected is further chosen to go into solution with the temperature sensitive material in melted form. The dye is permitted to go into solution, the solution migrates through the blotting paper by capillarity and becomes clearly visible through the plastic cover sheet.

Since the absorbent material 26 saturated with the temperature sensitive material is attached to the bottom of cup 14, it will not normally come in contact with dye 30 even if the temperature necessary to melt the material has been attained or exceeded. Tests have shown that a disposable thermometer in accordance with the present invention may be heated to a temperature in excess of 115°F without any indication of the dye going into solution so long as the dye and absorbent material are maintained apart in the manner indicated above. In this condition, the thermometer is unarmed and may be shipped, transported, and stored.

Figure 4:
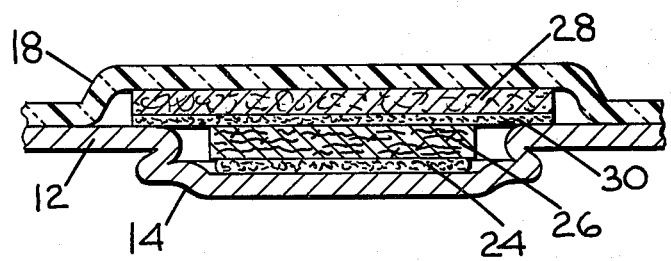
FIG. 4 is a view of FIG. 3 after the thermometer has been "armed"

As stated, the base member 12 comprises a readily deformable foil so that if desired, with relative ease the foil may be defomed as shown in FIG. 4 to bring the temperature sensitive material in contact with the dye. Thus, prior to using the present thermometer, it must be "armed" by crushing the cups 14. This brings the absorbent material 26 into immediate contact with dye 30 on blotting paper 28. After the cups are crushed, if the thermometer is exposed to a temperature which will melt the material in any of the cups, the layer of dye associated with that cup will go into solution, migrate through the covering blotting paper and thus become visible through the plastic top sheet.

Figure 5:
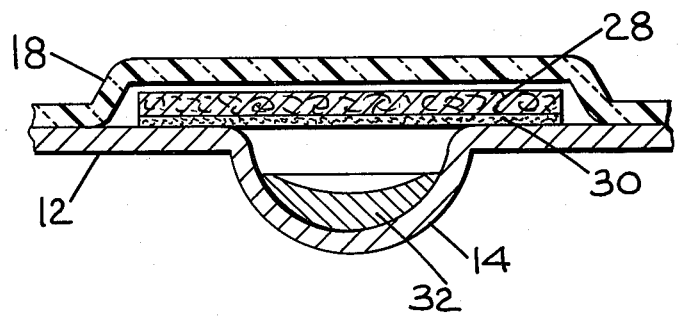
FIG. 5 is a fragmentary sectional view of an alternate embodiment of the present thermometer in "unarmed" condition; and, FIG. 6 is a fragmentary sectional view of still another alternate embodiment.

Referring to FIG. 5, there is shown another embodiment of the present invention. In this alternate embodiment, the deformable base 12 includes cups 14 in which is directly deposited a limited amount of meltable material 32 in place of the pad saturated with the meltable material of the primary embodiment. In other ways and in operation, this alternate embodiment is the same as the primary embodiment. The amount of material deposited in cup 14 must be limited so that the surface tension of the material, when melted, holds it in place within the cup so that it cannot contact the absorbent material 28. It has been found that the surface tension of the meltable material is sufficient to hold the melted material within the cup despite the normal shock and accelerations to which the thermometer would normally be subjected during shipping and storage. The thermometer may even be turned upside down without the material flowing into contact with absorbent material 28. The proper amount of material to be deposited into cup 14 will depend considerably upon the cup size and shape and may be determined experimentally. As before, prior to use, the cup is crushed, thereby insuring the melted material dissolving the dye if the temperature to melt the temperature sensitive material is attained.

Figure 6:
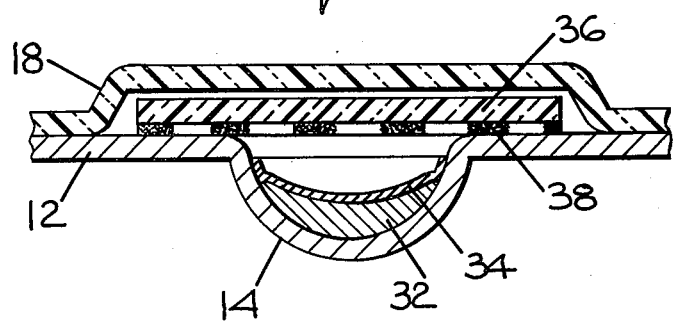

Referring to FIG. 6, there is shown still another alternate embodiment of the present invention. In this second alternate embodiment a quantity of temperature sensitive material is deposited into the bottom of the cup in a similar manner to that of FIG. 5. A thin film or layer of material 34 is then deposited over the surface of the temperature sensitive material 32 so as to confine the material within the cup. Layer 34 may, for example, be formed from a thin film of lacquer deposited over the temperature sensitive material. The film serves to seal the temperature sensitive material and also to anchor it to the cup. The sealing film must have a melting temperature substantially higher than the melting temperature of the temperature sensitive material. Once again, prior to use, the cup must be crushed to break the film and to "arm" the thermometer so as to insure the melted material reaching the dye if the temperature necessary to melt the temperature sensitive material is attained.

The indicator portion of the thermometer shown in FIG. 6 could be identical to that shown in FIGS. 3 and 5 or could be in the form of another embodiment as shown in FIG. 6. The indicator portion of FIG. 6 comprises a flat piece of clear plastic 36, such as cellulose acetate, with an indicator pattern 38 printed on its lower face as shown. The indicator pattern is formed of a dye similar to the dyes previously mentioned which is printed onto the plastic 36. Thus, in this embodiment, the dye pattern is clearly visible through the top sheet of the "unarmed" thermometer.

As before stated, prior to use cup 14 is crushed causing the film 34 to rupture and the temperature sensitive material 32 to come into contact with the dye pattern 38 if melted. If the indicator has not been exposed to the predetermined temperature necessary to melt material 32, the dye pattern will remain a regular and even pattern, easily visible through the top of the thermometer, indicating that the particular temperature has not been attained. However, if the temperature has been attained, the dye will go into solution in the melted material and the pattern will be distorted and blotched rather than an even pattern, indicating that the melting temperature has been attained. This particular embodiment is faster acting than the other embodiments since it does not require tha the dye solution be absorbed through the blotting paper. Instead, all that is required is that the melted material disperse the dye thereby disturbing the original pattern.

Thus, the present invention provides a disposable thermometer that need not be refrigerated prior to use and may be subjected to normal handling without the fear of providing a premature temperature indication. The thermometer is inexpensive to manufacture and is therefore suitable for disposal after a single use. The thermometer eliminates the need for cleaning and sterilizing after each use and eliminates the possibility of cross-infection between patients.

Having thus described the invention, what is claimed is:

1. A disposable, irreversible, clinical thermometer comprising: a base member provided with at least one cup therein; a temperature sensitive material disposed within said cup, said material being meltable at a predetermined temperature; a covering member overlying said portions of the base member; said cup extending away from said covering member and being so dimensioned that when melted, the surface tension of the material is sufficient to maintain the material within the cup regardless of the orientation of the cup; dye means carried by said covering member and spaced apart from said material, said dye means being soluble in said material when in melted form; at least one of said members being deformable with respect to the other of said members whereby to enable said dye means to come into contact with said material; means to maintain said temperature sensitive material and dye means in spaced apart relationship until said one member is deformed; and, means adapted to indicate if said dye means goes into solution in said material in meltable form.

2. A disposable, irreversible, clinical thermometer in accordance with claim 1 wherein the base is provided with a plurality of cups and associated dye means and indicating means; each of said cups contains therein a material adapted to melt at a different predetermined temperature, and said indicating means includes indicia of each of said predetermined temperatures.

3. A disposable, irreversible, clinical thermometer in accordance with claim 1 wherein said base member comprises a sheet of deformable, metal foil.

4. A disposable, irreversible, clinical thermometer comprising: a base member provided with at least one cup therein; a temperature sensitive material disposed within said cup, said material being meltable at a predetermined temperature; a covering member overlying said portions of the base member; said cup extending away from said covering member; dye means carried by said covering member and spaced apart from said material, said dye means being soluble in said material when in melted form; at least one of said members being deformable with respect to the other of said members whereby to enable said dye means to come in contact with said material; film means disposed over said material sealing said material and anchoring said material to said cup to maintain said material and dye means in spaced apart relationship until said one member is deformed, said film means being adapted to break when said one member is deformed; said covering member including a transparent portion having a bottom surface facing said base member and said dye being disposed in a regular pattern on said bottom surface whereby the interaction of said dye and melted material causes a visible distortion of said regular pattern.

5. A disposable, irreversible, clinical thermometer in accordance with claim 4 wherein the dye comprises a powder carried on one surface of a sheet of absorbent material and the indicating means includes the opposite surface of said sheet whereby when said dye goes into solution with said melted material said dyed solution migrates through said sheet from said one surface toward said opposite surface so that a color change of said opposite surface is visible as a signal that said material has melted.

* * * * *